United States Patent [19]
Blankenship et al.

[11] Patent Number: 5,918,765
[45] Date of Patent: Jul. 6, 1999

[54] CONTAINER DISPENSING SYSTEMS ESPECIALLY USEFUL FOR DISPENSING EDIBLE CONES

[75] Inventors: R. Carl Blankenship, Sykesville; Charles M. Smith, Monkton, both of Md.; Kenneth H. Bealer, Wilmington, N.C.

[73] Assignee: Sweetheart Cut Company, Inc., Owings Mills, Md.

[21] Appl. No.: 08/931,939

[22] Filed: Sep. 17, 1997

[51] Int. Cl.⁶ .................................................. B65H 3/28
[52] U.S. Cl. ........................................ 221/221; 221/297
[58] Field of Search ............................ 221/7, 9, 13, 15, 221/92, 221, 223, 208, 289, 297

[56] References Cited

U.S. PATENT DOCUMENTS

| | | | |
|---|---|---|---|
| 3,181,728 | 5/1965 | West et al. ............................. | 221/221 |
| 3,777,504 | 12/1973 | Marchi ................................... | 62/73 |
| 4,188,768 | 2/1980 | Getman .................................. | 53/282 |
| 4,192,415 | 3/1980 | Krener et al. ......................... | 198/374 |
| 4,224,895 | 9/1980 | Launay .................................. | 118/16 |
| 4,498,273 | 2/1985 | Colamussi ............................. | 53/54 |
| 4,555,892 | 12/1985 | Dijkman ................................ | 53/142 |
| 4,643,905 | 2/1987 | Getman .................................. | 426/565 |
| 4,686,813 | 8/1987 | Sawada .................................. | 53/446 |
| 4,694,637 | 9/1987 | Bech et al. ............................. | 53/448 |
| 4,731,977 | 3/1988 | Maekawa ............................... | 53/443 |
| 4,799,351 | 1/1989 | Blanda .................................. | 53/446 |
| 4,899,866 | 2/1990 | Colamussi ............................. | 198/418.1 |
| 4,901,502 | 2/1990 | Colamussi ............................. | 53/143 |
| 5,064,666 | 11/1991 | Vos ........................................ | 426/94 |
| 5,102,672 | 4/1992 | Vos ........................................ | 426/94 |
| 5,228,267 | 7/1993 | Blankenship et al. ................ | 53/397 |
| 5,257,493 | 11/1993 | Cocchi et al. ......................... | 53/446 |
| 5,298,273 | 3/1994 | Ito .......................................... | 426/546 |
| 5,379,569 | 1/1995 | Mueller ................................. | 53/397 |

FOREIGN PATENT DOCUMENTS

| 1531889 | 1/1970 | Germany | ............................... 221/221 |
|---|---|---|---|

*Primary Examiner*—Kenneth Noland
*Attorney, Agent, or Firm*—Nixon & Vanderhye P.C.

[57] ABSTRACT

Container dispensing system sequentially dispense containers from a nested stack. The systems have a support frame for accepting multiple stack of nested containers aligned in a cross-machine direction having upper and lower opposed pairs of gates. The gates are coupled to the support frame and extend in the cross-machine direction. Each upper and lower opposed pairs of gates defines gate openings sized so as to capture and support a lowermost and a next lowermost container in the stack respectively. A controller (e.g., a programmable controller operatively coupled to pneumatic solenoid valves or the like) controllable moves the upper and lower opposed pairs of gates between their gated and released positions such that (i) the upper and lower pairs of opposed gates are each in the gated position so as to respectively capture and support the lowermost and next lowermost containers in the stack, (ii) the lower pair of opposed gates is moved into the released position while the upper pair of opposed gates remains in the gated position so as to allow the lowermost container to drop by gravity from the stack thereof, and thereafter (iii) the lower pair of opposed gates returns to the gated position before the upper pair of opposed gates moves to the released positions to allow the stack to drop onto and be supported by the lower pair of opposed gates. The system most preferably includes a container stripping assembly for stripping the lowermost container from the stack.

12 Claims, 8 Drawing Sheets

CONTAINER DISPENSING SYSTEMS ESPECIALLY USEFUL FOR DISPENSING EDIBLE CONES

FIELD OF THE INVENTION

The present invention relates generally to the field of automated packaging systems. More specifically, the present invention relates to automated packaging systems whereby individual containers in a nested stack thereof may sequentially be delivered to an awaiting container holder. In particularly preferred embodiments, the present invention relates to systems which allow nested edible frozen dessert cones and their associated conformably shaped overwrap to be sequentially stripped from a nested stack thereof and delivered sequentially to an awaiting cone-holder.

BACKGROUND AND SUMMARY OF THE INVENTION

Individually wrapped frozen confection or desert cones are well known. Specifically, frozen dessert cones have an edible cone-shaped container (e.g., a sugar cone or the like) which is filled with a freezable dairy product, such as ice cream, ice milk, frozen yogurt or the like. The filled cone is covered with a conformably shaped paper or foil wrapper which is usually closed at its upper end by a lid. When the frozen confection is desired to be consumed, the lid and wrapper are removed thereby allowing the cone and its frozen dairy product to be eaten.

The automated production of frozen dessert cones is well known, for example, through U.S. Pat. No. 4,188,768 to Getman (the entire content of which is expressly incorporated hereinto by reference). In general, frozen dessert cones are produced by intermittently advancing a nested cone assembly (comprised of the frustroconically shaped edible prebaked cone and its conformably shaped paper overwrap) through a succession of stations. Thus, for example, an atomized spray of chocolate (or other flavored syrup) may be sprayed on the interior surfaces of the edible cone prior to the cone being filled with a freezable dairy product. Thereafter, a topping of chocolate (or other flavored syrup) and nuts may be applied immediately upstream of a lid applicator. The finished product is then ejected from its conveyance track and subjected to freezing conditions.

The nested cone assemblies are initially delivered to individual holders associated with trays of an intermittently moveable conveyor by means of a conventional gating system. That is, the nested cone assemblies are sequentially dropped from a stack held within a magazine by means of a conventional gating system which is timed to the intermittent advancement of the conveyor trays. In such a manner, the cone assemblies may be advanced through various downstream stations employed in the production of frozen dessert cones.

Sometimes, however, the nested cone assemblies do not reliably drop onto the conveyor tray holders. That is, the edible cone portion of one of the cone assemblies may cling or otherwise remain nested with the stack while its paper overwrap drops onto the conveyor tray. Such occurrences, therefore, result in off-specification product which must be discarded and thereby wasted. It would therefore be highly desirable if nested cone assemblies could more readily and reliably be stripped from the stack so as to minimize (if not eliminate entirely) off-specification product. It is toward fulfilling such a need that the present invention is directed.

The present invention is most preferably embodied in a container dispensing system which sequentially dispenses containers from a nested stack having a support frame for accepting multiple stacks of nested containers aligned in a cross-machine direction having upper and lower opposed pairs of gates. The gates are coupled to the support frame and extend in the cross-machine direction. Each upper and lower opposed pairs of gates defines gate openings sized so as to capture and support a lowermost and a next lowermost container in the stack, respectively. A controller (e.g., a programmable controller operatively coupled to pneumatic solenoid valves or the like) controllably moves the upper and lower opposed pairs of gates between their gated and released positions such that (i) the upper and lower pairs of opposed gates are each in the gated position so as to respectively capture and support the lowermost and next lowermost containers in the stack, (ii) the lower pair of opposed gates is moved into the released position while the upper pair of opposed gates remains in the gated position so as to allow the lowermost container to drop by gravity from the stack thereof, and thereafter (iii) the lower pair of opposed gates returns to the gated position before the upper pair of opposed gates moves to the released positions to allow the stack to drop onto and be supported by the lower pair of opposed gates.

The system of most preferably includes a container stripping assembly for stripping the lowermost container from the stack. In this regard, the container stripping assembly includes: a support block which is vertically movable between raised and lowered positions, and a support rod having one end coupled to the support block so as to extend in the cross-machine direction. A plurality of cross-support rods are connected to the support rod and extend in a machine direction. A plurality of stripping fingers are carried by a respective one of the cross-support rods for stripping the lowermost container from the stack in response to movement of the support block to the lowered position thereof. In such a manner, therefore, the lowermost container in the stack is reliably allowed to drop by gravity onto an awaiting container holder associated with an intermittently movable conveyor.

These, and other aspects and advantages of the present invention will become more clear from the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structure elements, and wherein.

DETAILED DESCRIPTION OF THE INVENTION

Figure 1:
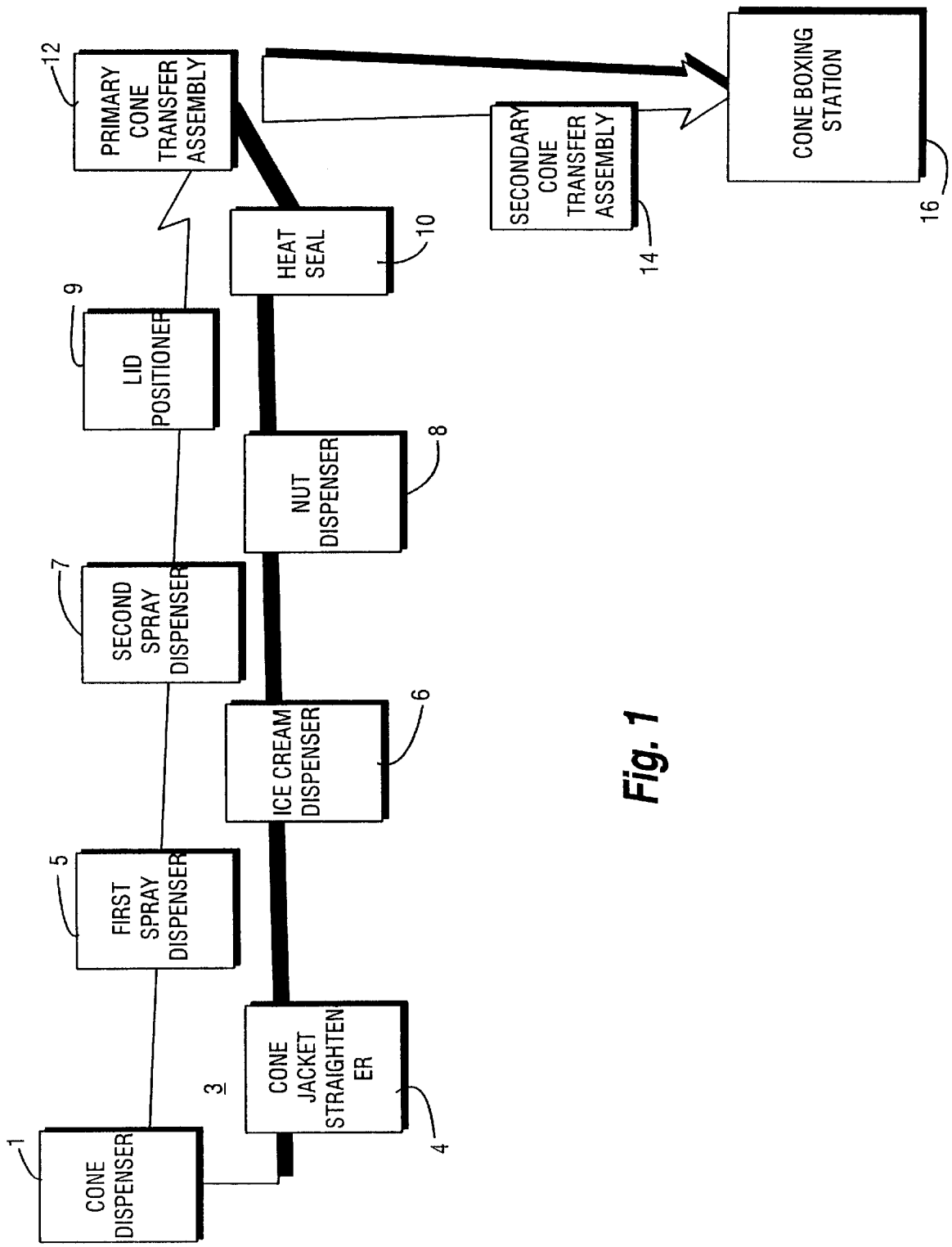
FIG. 1 is a schematic box diagram showing the various stations employed to automatically fill package frozen dessert cones which includes a lid transfer and positioning system in accordance with the present invention.

Accompanying FIG. 1 depicts schematically the various operations employed in the present invention. Specifically, frozen confection cones may be produced using any number (or all) of the production stations disclosed more fully in the above-cited U.S. Pat. No. 4,188,768 to Getman. That is, the system 1 may include a cone dispensing station 2 whereby nested edible cones and their conformably shaped paper overwraps may be dispensed onto a conveyor 3. The cones may thereafter be brought into the cone jacket straightener 4 which ensures that the cones and jackets are properly positioned on the conveyor 3.

The cones may then be brought sequentially through a first spray dispenser 5, an ice cream dispenser 6 and a second spray dispenser 7. The first spray dispenser 5 dispenses a spray of flavored syrup (e.g., chocolate) so as to coat the interior surface of the cone into which the ice cream is to be dispensed by the dispenser 6. The second spray dispenser 7 will thereafter dispense a flavored syrup topping spray onto the ice cream in the cone. Most preferably, the syrup dispensers 6 and/or 7 are in accordance with U.S. patent application Ser. No. 08/929,368 (Atty. Dkt. No. 956-178) filed even date herewith (the entire content of which is expressly incorporated hereinto by reference). A quantity of nuts may thereafter be applied to the top of the ice cream in the cone by the nut dispenser 8. A paper lid is positioned over the top of the ice cream filled cone by the lid positioner and is heat-sealed to the outer paper wrapper by means of the heat seal unit 10. One particularly preferred container lidding system that may be employed din the lid positioner station 9 is disclosed more fully in U.S. application Ser. No. 08/932,912 filed even date herewith (Atty. Dkt. No. 956-177), the entire content of which is expressly incorporated hereinto by reference.

Thereafter, the finished cones are transferred by the primary cone transfer station 12 so that multiple pairs of such cones are reoriented from their machine aligned position to a head-to-tail cross-machine position as briefly noted above. The reoriented array of cones may then be brought to the secondary cone transfer assembly 14 where the array is transferred as a unit to a cone boxing station 16. The cone array is thus placed by the secondary transfer station 14 into a suitably configured container at the boxing station 16 conforming to the external shape of the cone array. The boxed cones may then be shipped to retail customers. Most preferably, the primary and secondary cone transfer assemblies are in accordance with U.S. application Ser. No. 08/889,878 filed Jul. 8, 1997 (Atty. Dkt. No. 956-173), the entire content of which is expressly incorporated hereinto by reference.

Figure 2:
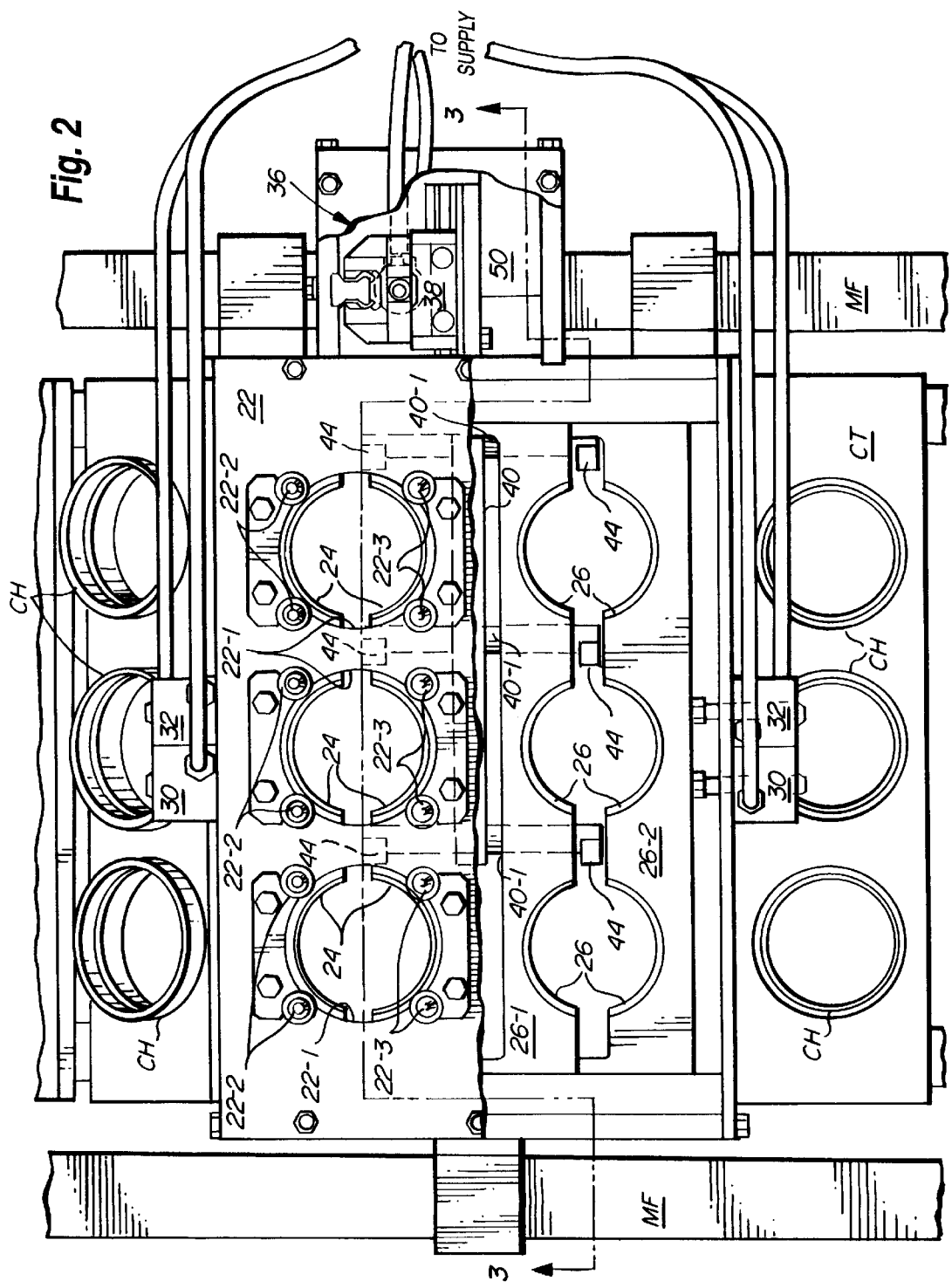
FIG. 2 is a top plan view of a cone dispensing system in accordance with the present invention.
Figure 3:
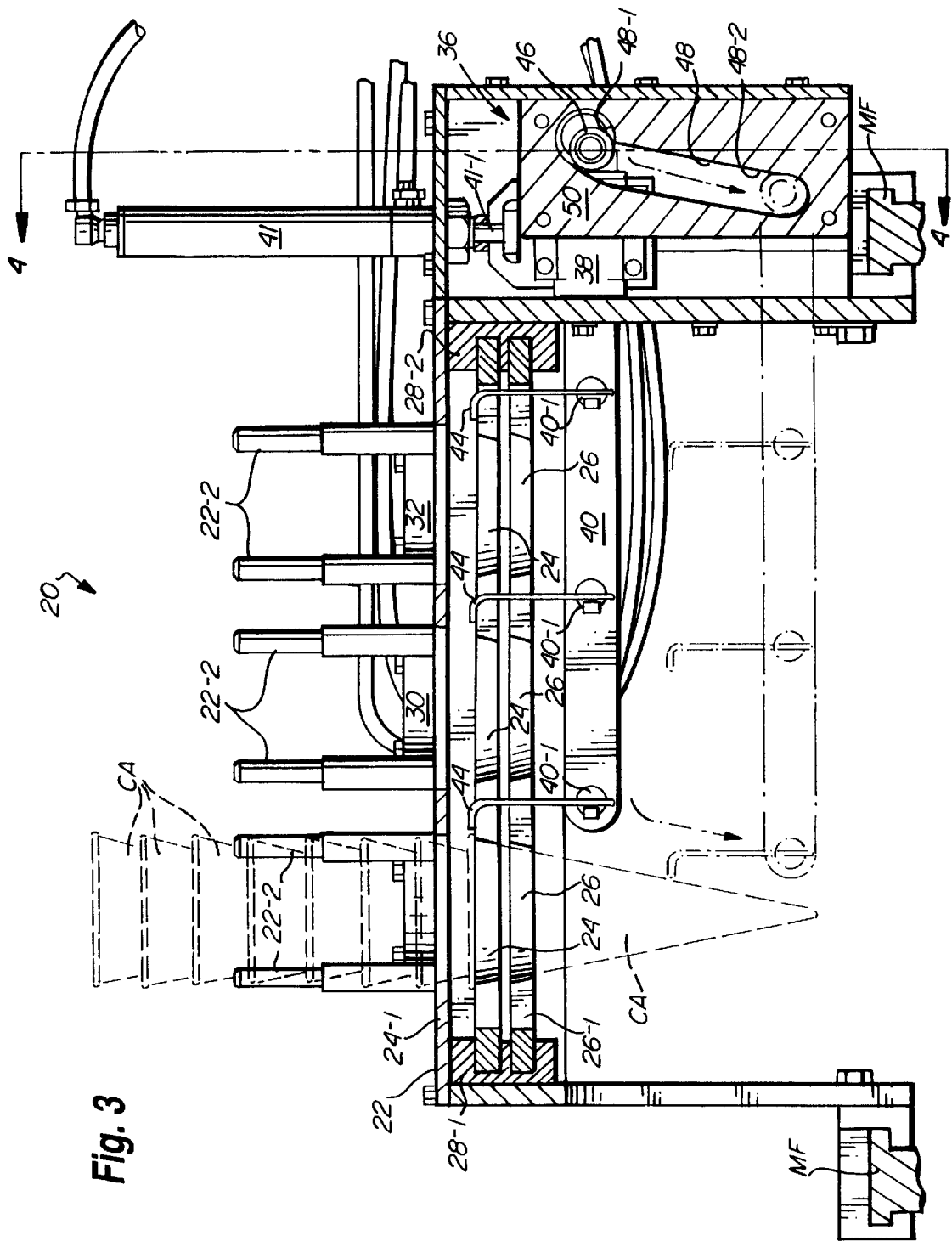
FIG. 3 is a side elevational of the cone dispensing system depicted in FIG. 2 as taken along lines 3—3 therein.
Figure 4:
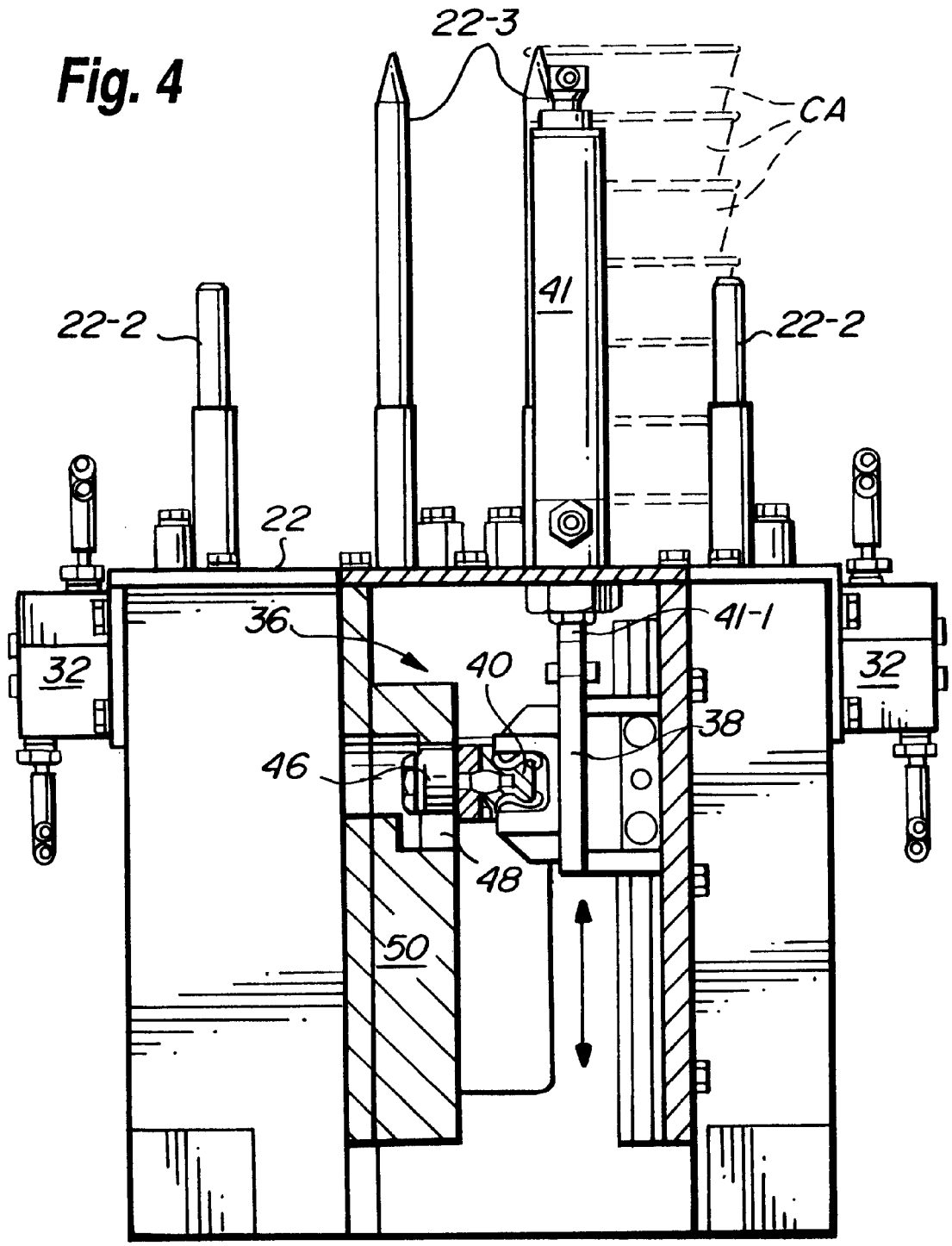
FIG. 4 is an end elevational view of the cone dispensing system depicted in FIG. 3 as taken along lines 4—4 therein.

Accompanying FIGS. 2–4 show in greater detail the structural components of a particularly preferred cone dispensing system 20 according to the present invention that may usefully be employed in the cone dispenser station 1 of FIG. 1.

In this regard, the system 20, includes a frame assembly 22 which is attached to the frozen dessert cone machine frame MF so as to bridge the conveyor trays CT (see FIG. 2) in the cross-machine direction. Each of the conveyor trays CT is provided with an cross-machine aligned series of cone-holders CH which define an aperture adapted to receive each of the cone assemblies CA (see FIGS. 3 and 4) in a tail-first manner. As noted previously, each of the cone assemblies CA is comprised of an inner edible frozen dessert cone and a sanitary (typically paper) conformably shaped overwrap.

The frame 22 defines a plurality of apertures 22-1 which, in the embodiment depicted in FIGS. 2–4 just happens to be arranged in a 2×3 array to enable a total of six cone assemblies to be delivered to a respective one of the holders CH of the awaiting container trays CT. The apertures 22-1 are sized to allow the cone assemblies CA to pass therethrough—that is, are slightly larger diameter as compared to the nominal diameters of the cone assemblies CA. The cone assemblies CA are presented to the apertures 22-1 in a tail-first stack which is stabilized by support rods 22-2 and 22-3.

Each of the apertures 22-1 is in registry with the partially circular jaws 24, 26 of opposed sets of respective upper and lower gates 24, 26. The partially circular jaws 24, 26 are of sized so as to have a slightly smaller nominal cross-sectional diameter as compared to the diameter of the cone assemblies CA. The opposed upper and lower gates 24-1, 24-2 and 26-1, 26-2 are held by lateral slide blocks 28-1, 28-2 which permit reciprocal movements thereof between a gated position (wherein the nominal diameter of the circular jaws 24, 26, respectively, is slightly smaller than the diameter of the cone assemblies CA) and a released position (wherein the upper and lower gates 24-1, 24-2 and 26-1, 26-2 separate sufficiently to cause the nominal diameter of the circular jaws 24, 26, respectively, to expand and thereby be greater than the nominal diameter of the cone assemblies CA). Movement of each set of upper and lower gates 24-1, 24-2 is controlled via pneumatically operated air cylinders 30, 32, respectively. Controlled operation and timing of the air cylinders 30, 32 may be effected by suitable controller-activated solenoid valves (not shown).

In order to ensure that the cone assemblies CA are reliably stripped from the stack, the present invention includes a stripping assembly 36. The stripping assembly 36 generally includes a support block 38 which supports in cantilever fashion a support rod 40. The support block 38 is coupled to the control rod 41-1 of pneumatic control cylinder 41 so as to be reciprocally moveable between a raised and lowered positions. The proximal end of the cantilevered support rod 40 is slidably coupled to the support block 38 so that the support rod 40 is capable of reciprocal horizontal movements towards and away from the cone assemblies CA. The support rod 40 carries a plurality of cross-support rods 40-1 corresponding in number to the number of stacks of cone assemblies CA associated with each set of jaws 24, 26 (which in the embodiment depicted just happens to be three). Each of the cross-support rods, in turn, carries at a terminal end thereof a generally inverted L-shaped stripping finger 44.

The proximal end of the support rod 40 carries a rotatable cam follower 46 which is received within cam slot 48 defined in cam block 50. In this regard, the cam slot 48 includes upper and lower segments 48-1, 48-2, respectively (see FIG. 3). In this regard, the upper segment 48-1 has a greater angle with respect to a vertical machine-direction plane as compared to the lower segment 48-2. More specifically, the angle of the lower segment 48-2 closely conforms to the cross-sectional angular profile of the cone assemblies CA.

Thus, actuation of the cylinder 41 between its raised position and into its lowered position, the support rod 40, and the stripping fingers 44 carried thereby, will initially be advanced toward the cone assemblies CA by virtue of the upper cam segment 48-1 until the ends of the stripping fingers 44 are in contact with, or just minimally spaced from (e.g., less than about the thickness of the edible cone), the lowermost one of the cone assemblies CA in the stack. Continued downward movement of the support block 38 will thus cause the cam follower to follow the profile of the lower segment 48-2 so that the end of the stripping fingers 44 closely follows the profile of the cone assemblies CA. In such a manner, therefore, any cone assembly CA or parts thereof that may remain in the stack after the gates 26-1, 26-2 are moved into their released positions will be stripped from the stack and fall by gravity into an awaiting cone holder CH.

Figure 5A:
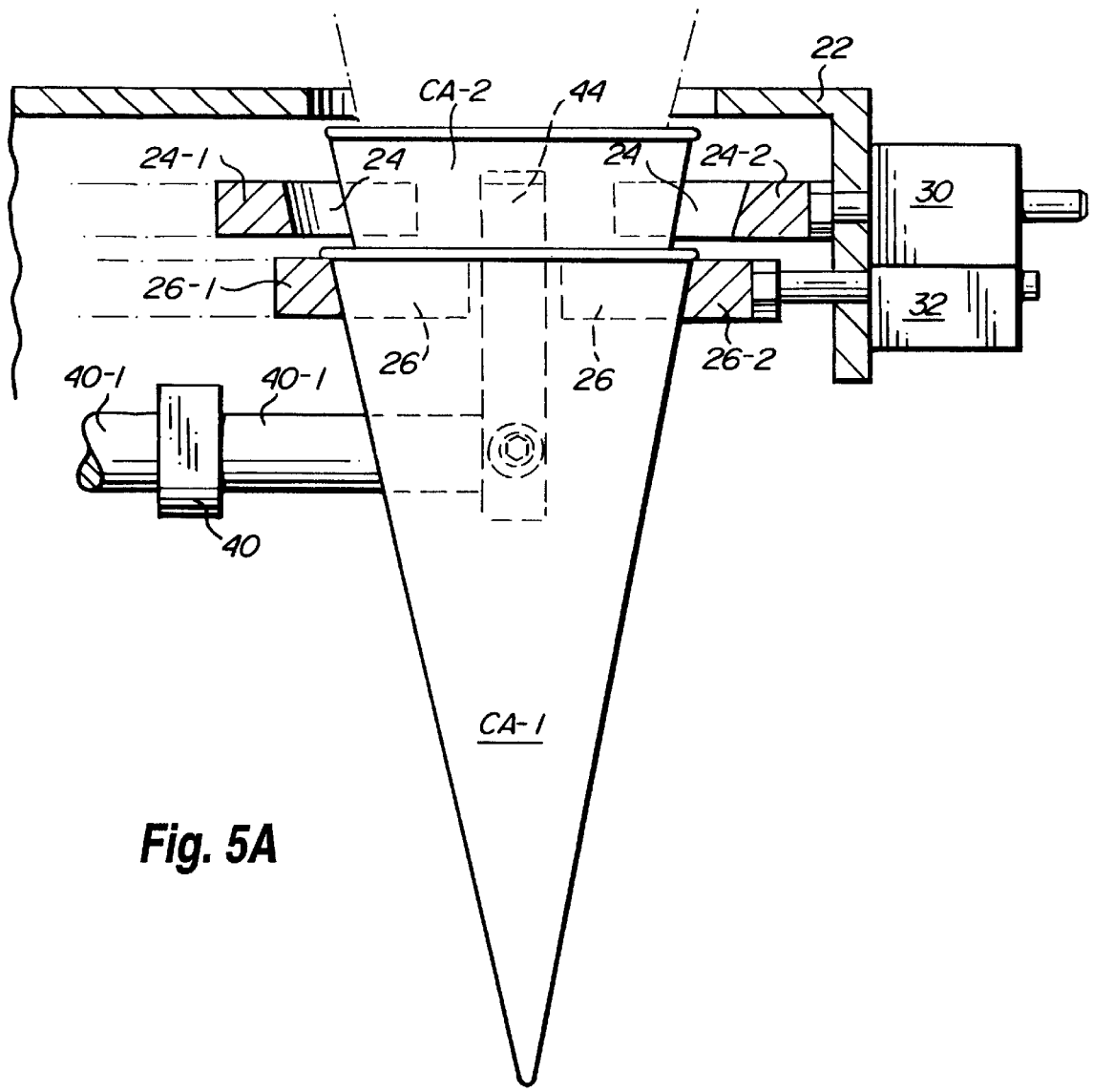
FIGS. 5A–5D are schematic elevational views collectively showing an operational sequence for the cone dispensing system of this invention.

Accompanying FIGS. 5A–5D depict in schematic fashion and exemplary sequence of operation of the cone dispensing system 20 according to the present invention. In this regard, as shown in FIG. 5A, the sequence of operation begins with the lowermost cone assembly (noted by CA-1 in FIGS. 5A–5D) being held by he lower gates 26-1, 26-2 being in their gated position. The upper gates 24-1, 24-2 are, however, in their released position in such a state.

Figure 5B:
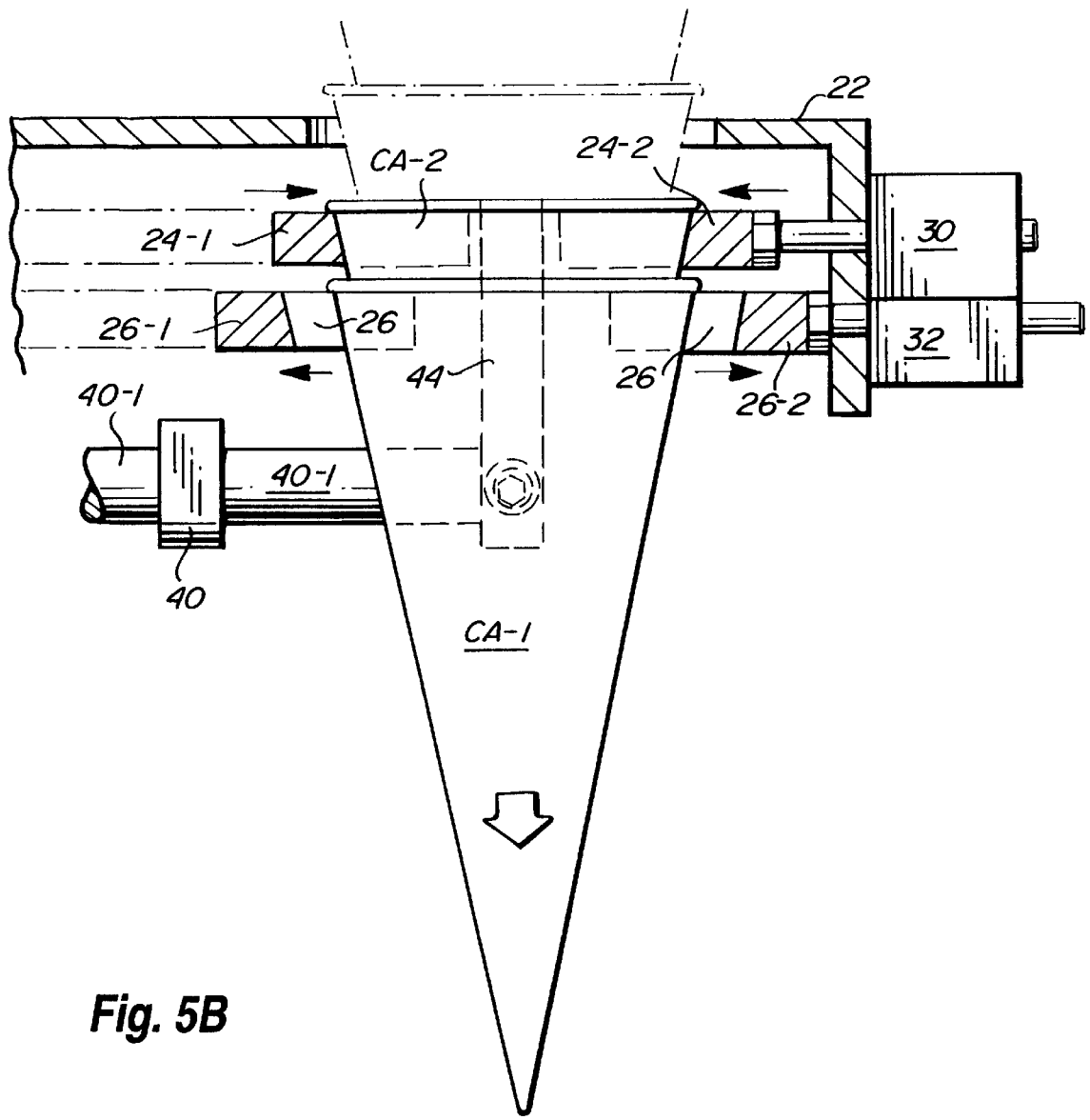

Upon actuation of cylinder 30, the upper gates 24-1, 24-2 will move into their gated position (i.e., will close relative to one another) so as to capture the next successive cone assembly (designated by CA-2 in FIGS. 5A–5D) in the stack as shown in FIG. 5B. When in their gated position, therefore, the upper gates 24-1, 24-2 will thus hold the cone assembly CL-2 in the stack. Momentarily after the upper gates 24-1, 24-2 are moved to their gated position, the lower gates 26-1, 26-2 will be moved to their released position by actuation of cylinder 32 thereby allowing the cone assembly CA-1 to fall by gravity into an awaiting one of the cone holders CH positioned immediately therebelow.

Figure 5C:
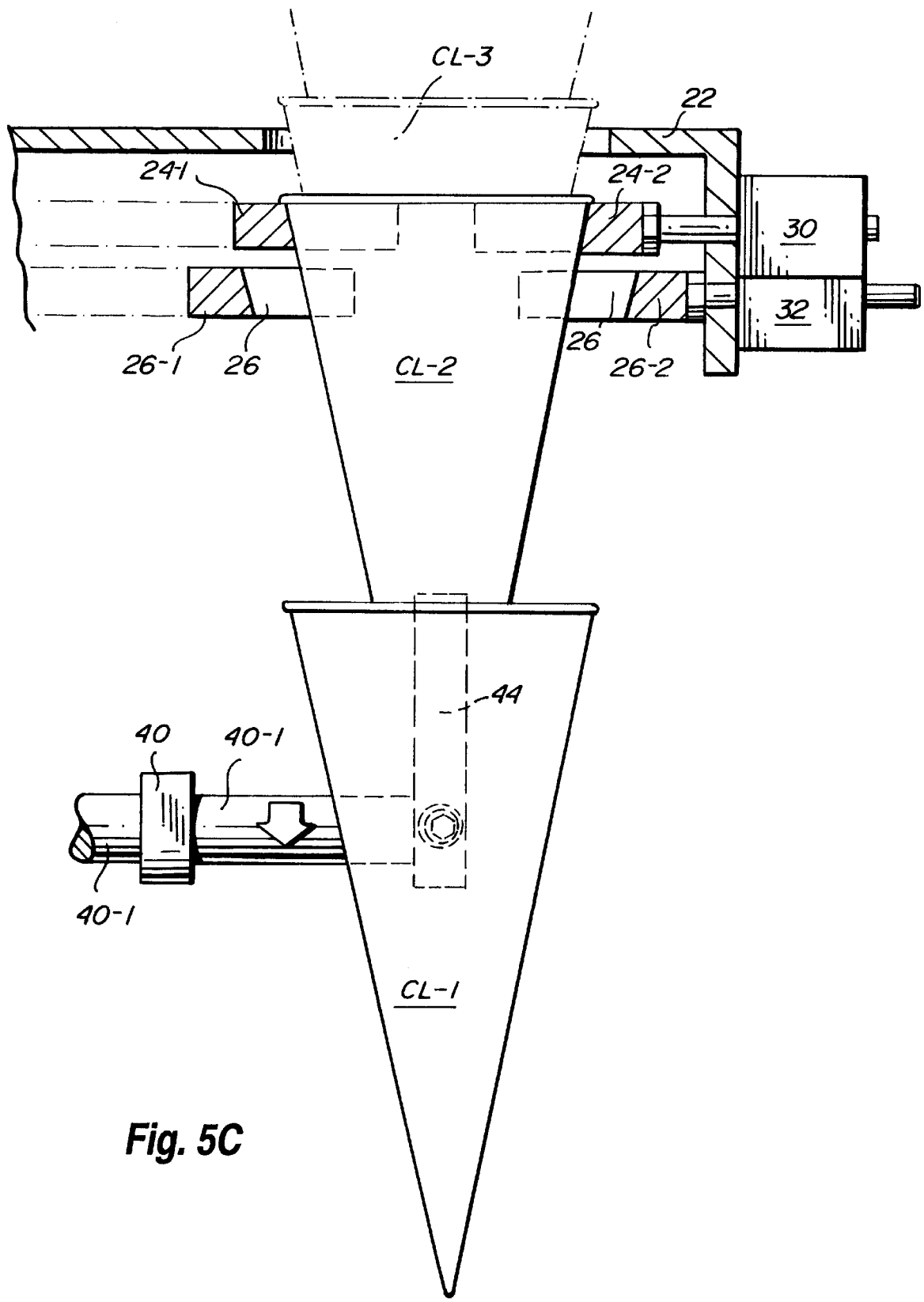

Upon movement of the lower gates 26-1, 26-2 to their released position, the cylinder 41 will be actuated causing a downstroke movement of its control rod 41-1. The support block 38 will thus be forced downwardly causing the stripping fingers 44 to initially move toward the cone assembly CA-2 and then along its cross-sectional profile. The stripping fingers 44 during such downward movement will thus contact the upper rim of the cone assembly CA-1 stripping it physically off the stack as shown in FIG. 5C.

Figure 5D:
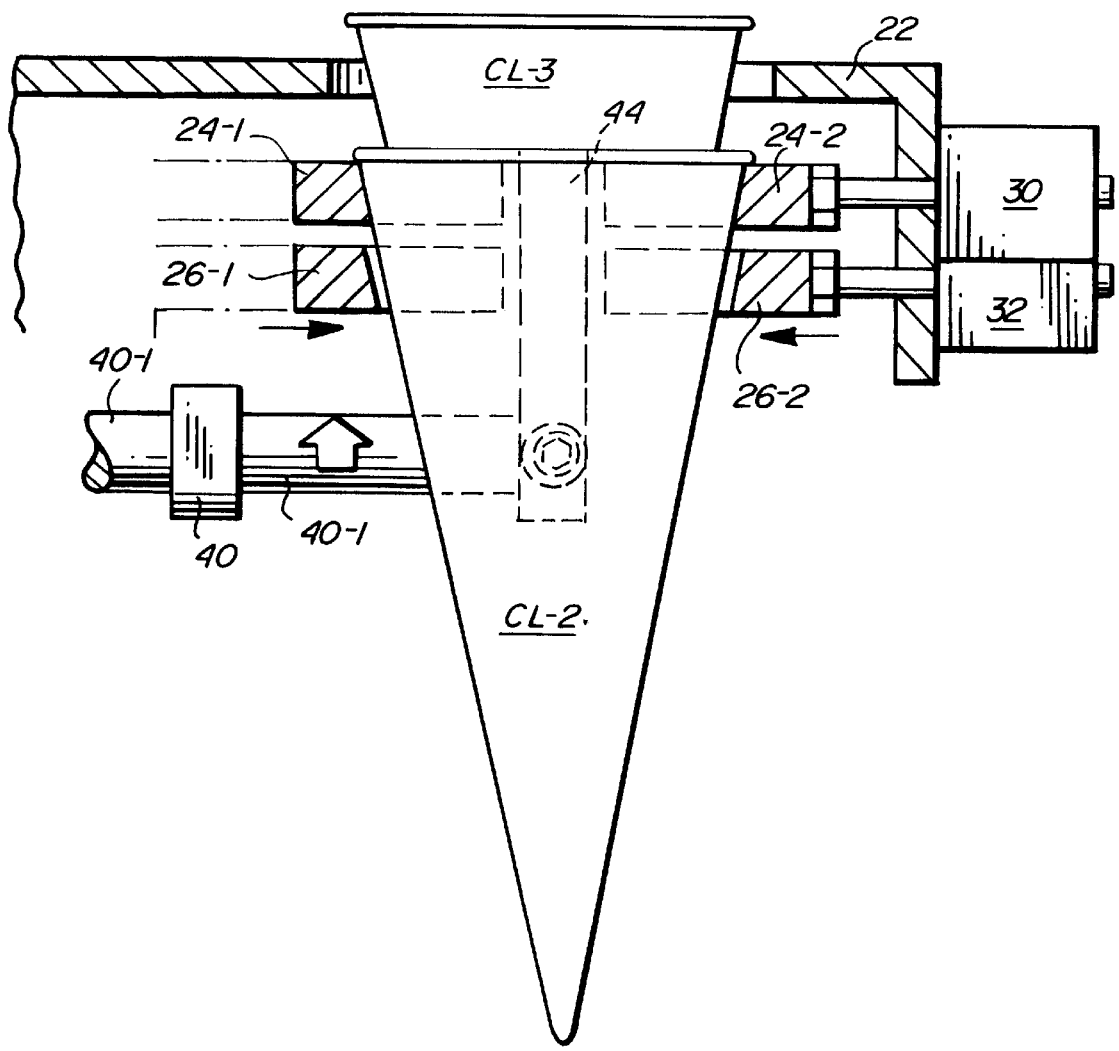

At the end of the downstroke, actuation of the cylinder 41 will be reversed causing upstroke movement of its control rod 41-1. The stripping fingers 44 will thus be carried to their rest position as shown in FIGS. 5A and 5D) by virtue of the support block 38 moving upwardly and by virtue of the support rod 40 following the profile of the cam slot 48 as described previously. The lower gates 26-1, 26-2 will thus be moved back into their gated position by actuation of cylinder 32 as shown in FIG. 5D. Momentarily thereafter, the upper gates 24-1, 24-2 will be moved into their released position by actuation of cylinder 30. The entire stack of cone assemblies CA will thus shift downwardly by gravity so that the cone CL-2 then becomes the lowermost one in the stack and is retained by the lower gates 26-1, 26-2. The cone CI-2 and the next sequential cone CL-3 in the stack will then await the next sequence of operation which is identical to that described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container dispensing system for sequentially dispensing containers from a nested stack thereof, comprising:
   a support frame for accepting multiple stacks of nested containers aligned in a cross-machine direction;
   upper and lower opposed pairs of gates coupled to said support frame and extending in said cross-machine direction, each said upper and lower opposed pairs of gates defining gate openings sized so as to capture and support a lowermost and a next lowermost container in the stack, respectively;
   said upper and lower opposed pairs of gates being moveable between a gated position wherein said gate openings are constricted to a nominal diameter less than said containers, and a released position wherein said gate openings are expanded to a nominal diameter greater than said containers;
   a controller for controllably moving said upper and lower opposed pairs of gates between said gated and released positions such that (i) said upper and lower pairs of opposed gates are each in said gated position so as to respectively capture and support said lowermost and next lowermost containers in the stack, (ii) said lower pair of opposed gates is moved into said released position while said upper pair of opposed gates remains in said gated position so as to allow said lowermost container to drop by gravity from the stack thereof, and thereafter (iii) said lower pair of opposed gates returns to said gated position before said upper pair of opposed gates moves to said released positions to allow said stack to drop onto and be supported by said lower pair of opposed gates, and
   a container stripping assembly for stripping said lowermost container from said stack, said container stripping assembly including,
   (a) a support block vertically movable between raised and lowered positions;
   (b) a support rod having one end coupled to said support block so as to extend in said cross-machine direction;
   (c) a plurality of cross-support rods connected to said support rod and extending in a machine direction; and
   (d) a plurality of stripping fingers, each said stripping finger being carried by a respective one of said cross-support rods for stripping said lowermost container from said stack in response to movement of said support block to said lowered position thereof.

2. The system of claim 1, wherein said container stripping assembly includes a camming assembly which causes said stripping fingers to follow container profiles when said support block is moved vertically into said lowered position.

3. The system of claim 2, wherein said camming assembly includes a cam slot, and a cam wheel coupled to said support block and received within said cam slot.

4. The system of claim 3, wherein said support rod is slidably received within said support block to allow for reciprocal movements towards and away from the container stacks.

5. The system of claim 4, wherein said cam slot includes an initial segment which moves the fingers toward said lowermost container, and a following segment which causes the fingers to follow a non-vertical profile of said container.

6. A system as in any preceding claim wherein the containers include edible cones.

7. A system for sequentially dispensing containers from a stack thereof, comprising a container stripping assembly for stripping a lowermost container from said stack, wherein said container stripping assembly includes:
   a support block vertically movable between raised and lowered positions;
   a support rod having one end coupled to said support block so as to extend in said cross-machine direction;

a plurality of cross-support rods connected to said support rod and extending in a machine direction; and a plurality of stripping fingers, each said stripping finger being carried by a respective one of said cross-support rods for stripping said lowermost container from said stack in response to movement of said support block to said lowered position thereof.

8. The system of claim 7, wherein said container stripping assembly includes a camming assembly which causes said stripping fingers to follow container profiles when said support block is moved vertically into said lowered position.

9. The system of claim 8, wherein said camming assembly includes a cam slot, and a cam wheel coupled to said support block and received within said cam slot.

10. The system of claim 9, wherein said support rod is slidably received within said support block to allow for reciprocal movements towards and away from the container stacks.

11. The system of claim 10, wherein said cam slot includes an initial segment which moves the fingers toward said lowermost container, and a following segment which causes the fingers to follow a non-vertical profile of said container.

12. A system as in claim 7, wherein the containers include edible cones.

* * * * *